(12) United States Patent
Geller

(10) Patent No.: US 8,447,789 B2
(45) Date of Patent: May 21, 2013

(54) SYSTEMS AND METHODS FOR CREATING STRUCTURED DATA

(76) Inventor: Ilya Geller, Brooklyn, NY (US)

(*) Notice: Subject to any disclaimer, the term of this patent is extended or adjusted under 35 U.S.C. 154(b) by 377 days.

(21) Appl. No.: 12/878,675

(22) Filed: Sep. 9, 2010

(65) Prior Publication Data

US 2011/0066659 A1     Mar. 17, 2011

Related U.S. Application Data

(60) Provisional application No. 61/242,631, filed on Sep. 15, 2009.

(51) Int. Cl.
    *G06F 17/30*      (2006.01)
    *G06F 17/00*      (2006.01)
    *G06F 17/21*      (2006.01)

(52) U.S. Cl.
    USPC .............. 707/803; 707/791; 704/10; 715/259

(58) Field of Classification Search
    USPC ...... 707/802, 803, 791, 804; 704/10; 715/259
    See application file for complete search history.

(56) References Cited

U.S. PATENT DOCUMENTS

| | | | |
|---|---|---|---|
| 6,199,067 B1 | 3/2001 | Geller | |
| 6,205,456 B1* | 3/2001 | Nakao | 715/201 |
| 7,120,574 B2 | 10/2006 | Troyanova et al. | |
| 7,756,847 B2 | 7/2010 | Pauws et al. | |
| 7,779,347 B2* | 8/2010 | Christiansen et al. | 715/230 |
| 8,145,632 B2 | 3/2012 | Dexter et al. | |
| 2005/0108001 A1 | 5/2005 | Aarskog | |
| 2006/0047651 A1 | 3/2006 | Milic-Frayling et al. | |
| 2006/0143175 A1 | 6/2006 | Ukrainczyk et al. | |
| 2006/0242564 A1 | 10/2006 | Egger et al. | |
| 2006/0248068 A1 | 11/2006 | Chien et al. | |
| 2007/0011154 A1 | 1/2007 | Musgrove et al. | |
| 2008/0059187 A1 | 3/2008 | Roitblat et al. | |
| 2008/0263033 A1 | 10/2008 | Vailaya et al. | |
| 2009/0144609 A1 | 6/2009 | Liang et al. | |
| 2009/0198671 A1 | 8/2009 | Zhang et al. | |
| 2009/0276420 A1 | 11/2009 | Qiu | |
| 2009/0306967 A1 | 12/2009 | Nicolov et al. | |
| 2010/0005081 A1 | 1/2010 | Bennett | |
| 2011/0040733 A1 | 2/2011 | Sercingoglu et al. | |
| 2011/0066659 A1 | 3/2011 | Geller | |

OTHER PUBLICATIONS

Hua Bolin, "Knowledge Extraction Based on Sentence Matching and Analyzing", 2008 International Symposium on Knowledge Acquisition and Modeling, Dec. 21-22, 2008, pp. 122-126.*

Hua Bolin, "Knowledge Extraction Based on Sentence Matching and Analyzing", 2008 International Sypmposium on Knowledge Acquisition and Modeling, Dec. 21-22, 2008, pp. 122-126.

* cited by examiner

*Primary Examiner* — Cheryl Lewis
(74) *Attorney, Agent, or Firm* — Cooper & Dunham LLP

(57) ABSTRACT

A computer system implemented method of creating and using structured data from a textual input, comprising: providing a table for structured data, receiving at least one textual input, dividing at least a portion of the textual input into paragraphs, for each of the paragraphs, creating a profile by extracting predicative phrases from the paragraph, for each of the predicative phrases, extracting a noun from the predicative phrase, for each extracted noun, receiving a textual definition from the dictionary corresponding to the noun, dividing the textual definition for each noun into definition paragraphs, and creating a profile for each definition paragraph by extracting predicative phrases of the definition paragraph, comparing the profile of the definition paragraphs to the profile of the paragraph containing the noun based upon an algorithm for compatibility; and adding the predicative phrase containing the noun into the table for structured data if the algorithm is satisfied.

20 Claims, 2 Drawing Sheets

SYSTEMS AND METHODS FOR CREATING STRUCTURED DATA

CROSS-REFERENCE TO RELATED APPLICATION

This application claims the benefit of priority under 35 U.S.C. 119(e) to U.S. Provisional Application Ser. No. 61/242,631, filed Sep. 15, 2009, entitled "SYSTEMS AND METHODS FOR CREATING STRUCTURED DATA," the entire disclosure of which is incorporated by reference herein.

INCORPORATION BY REFERENCE

U.S. Pat. No. 6,199,067 titled "System and method for generating personalized user profiles and for utilizing the generated user profiles to perform adaptive interne searches," and issued to the same inventor, is incorporated by reference herein.

FIELD OF THE INVENTION

The present invention is directed to the field of digital information processing.

BACKGROUND OF THE INVENTION

In the modern world information is increasingly being stored digitally, and the volume of such digitally stored information is growing rapidly. Searching this volume of information and separating the wheat from the chafe is increasingly important, as well as difficult. The ability to quickly search and find relevant information in volumes of unrelated, or superfluous, information can be of utmost importance. Accordingly, the present invention is directed towards a system and method of creating structured data which organizes digital information and reduces lexical noise.

SUMMARY OF THE INVENTION

In one embodiment, there is disclosed a computer system implemented method of creating and using structured data from a textual input. The method includes the steps of providing a table for structured data and receiving at least one textual input at least a portion of which is then divided into one or more paragraphs. These paragraphs are profiled by extraction of one or more predicative phrases contained therein. Nouns are then extracted from each predicative phrase that was extracted from the paragraph. For each of these extracted nouns, a connection a definition is retrieved from a dictionary. This definition is then divided into one or more paragraphs, which are then profiled by extracting one or more predicative phrases from each of the definition paragraphs. The profiles of the definition paragraphs are then compared, according to an appropriate compatibility algorithm, to the profile of the paragraph from which the noun extracted. If the algorithm is satisfied, the predicative phrase containing the noun is saved in a table for structured data. In further embodiments the uploaded text may be further divided into chapters.

In another embodiment, there is disclosed a computer readable medium containing a program which performs the functions of providing a table for structured data and receiving at least one textual input. The program further performs the functions of dividing at least a portion of the textual input into one or more chapters, and, for each of the chapters, dividing into one or more paragraphs. For each of the paragraphs, the program also performs the function of creating a profile by extracting one or more predicative phrases of the paragraph and, for each of the predicative phrases, establishing a connection to a dictionary and extracting textual definition from the dictionary corresponding to each noun in the predicative phrases. The program further performs the functions of dividing each textual definition for the respective nouns into one or more definition paragraphs and creating a profile for each definition paragraph by extracting one or more predicative phrases of the definition paragraph. The program also performs the functions of comparing the profiles of each definition paragraph to the profile of the paragraph containing the noun corresponding to the definition paragraph and its surrounding paragraphs based upon an algorithm for compatibility and adding the predicative phrases containing the noun into the database for structured data if the formula for compatibility is satisfied. In further embodiments the

DETAILED DESCRIPTION

Certain embodiments of the present invention will be discussed and it should be noted that references in the specification to phrases such as "one embodiment" or "an embodiment" means that a particular feature, structure or characteristic described in connection with the embodiment is included in at least one embodiment of the invention. The appearance of phrases such as "in one embodiment" in various places in the specification are not necessarily, but can be, referring to same embodiment.

In an embodiment of the invention, a computer system is specifically programmed to convert digital textual information into structured data using a process that minimizes the amount of lexical noise within the structured data. Such lexical noise is typically superfluous predicative definitions that do not explain the central themes contained within the digital textual information and, accordingly, removal of such noise often results in an improvement in the quality of the structured data. This structured data may then be used for efficient searching, and may be utilized by interne search engines, archival systems, information management systems and other systems maintaining textual information.

The computer system preferably includes such art recognized components as are ordinarily found in computer systems, including but not limited to processors, RAM, ROM, clocks, hardware drivers, associated storage, and the like. The computer-based system may include servers and connections to networks such as the Internet, Intranet, LAN, or other communication networks. The programming loaded on the computer system may be created in any programming language presently known or hereafter developed, for example, C, C++, JAVA, and C#.

Figure 1:
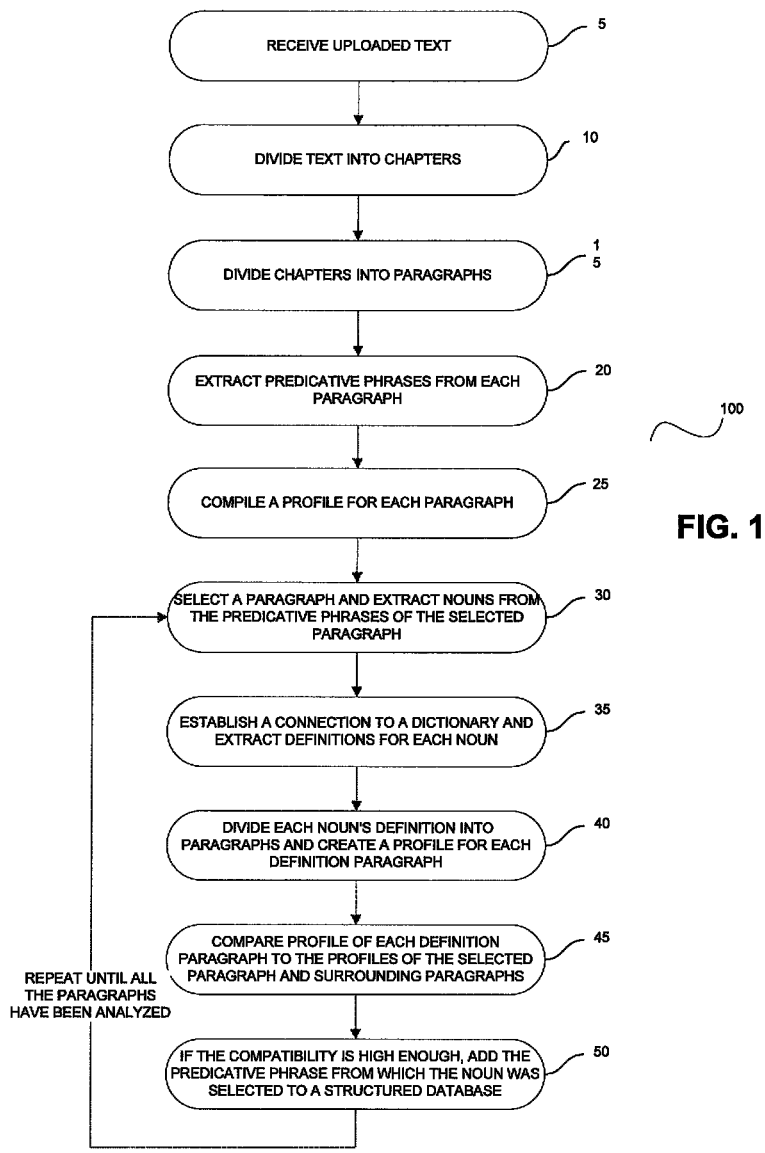
FIG. 1 is flow chart diagram of an exemplary embodiment of the present invention.

With reference to FIG. 1, an embodiment of the process 100 may commence, in step 5 with text being uploaded to a database of a computer system. The text may be a book, a periodical, electronic mail, SMS and/or any other text containing one or more words, sentences or phrases.

In step 10, the uploaded text is preferably divided into chapters. A chapter is typically the minimal textual division or a part of the given text that includes at least one paragraph, but preferably more than one paragraph. This division may be performed based upon a textual indicator within the text itself, such as a chapter heading or a specific font that designates a chapter heading, additionally or alternatively it may be performed based upon metadata, and/or any other type of indicator. In further embodiments, additionally or alternatively, the text may be divided into chapters, according to an algorithm by way of example, without regard to how the text has been divided the text into chapters.

In step 15 each chapter is preferably divided into paragraphs. A paragraph is a subdivision of a written composition that consists of one or more sentences, deals with one or more points/ideas or gives the words of one speaker, and can be extracted from text based upon textual indicators such as, for example, a hard return or tab (although any other suitable means or algorithm may be used).

In step 20 predicative phrases are preferably extracted from each sentence or clause of that exists in a paragraph. Clauses in complex sentences may be identified through the use of grammar rules, for example, by identifying commas and semicolons and presence of multiple predicates, or any other suitable algorithm A predicative phrase is a predicative definition preferably characterized by combinations of nouns and other parts of speech, such as a verb and an adjective and an article (e.g., the-grey-city-is). In the preferred embodiment each predicative phrase is a combination of an article, noun, verb, and adjective, although in alternate embodiments various combinations of nouns and verbs and other figures of speech may be utilized, for example, noun, verb, and adverb. Predicative phrases convey the central idea or ideas contained within a given sentence.

In certain embodiments, when extracting predicative phrases, the system may be configured to control for common noun phrases, idioms, or similar phrases. For example, "hot dog" may be treated as a noun, as opposed to a noun plus an adjective. Additionally, idioms such as "under the weather" may be treated as a single adjective. These noun phrases and idioms may be identified based upon a database of common phrases or idioms, but the system is not limited to any specific way of identifying them. Furthermore, in certain embodiments both the "noun phrases" and their components may be used to form predicative definitions, while in other embodiments they are mutually exclusive.

In step 25, a profile is preferably compiled for each paragraph that has been extracted. The profile of a paragraph typically includes the predicative phrases of the paragraph, and their respective weight, or importance, within that paragraph. The profile of a paragraph is essentially a summary of the theme or themes of a paragraph and it may include lexical noise. In other embodiments, profiles may also be created for the entire text or a part thereof. Such profiles would include the predicative phrases in the text, or a part thereof, and references to the paragraphs from which those phrases originated preferably saved into metadata.

Starting with step 30, the computer system preferably commences a recursive process that is, in a preferred embodiment, performed on each paragraph of each chapter in the uploaded text, proceeding from first to last paragraph from the first chapter to the last. In step 30, the computer system selects a paragraph ("Selected Paragraph"), analyzes the Selected Paragraph, and extracts nouns from the predicative phrases of the Selected Paragraph. It should be noted that the invention is not limited to any method of traversing the paragraphs and, in alternate embodiments, the paragraphs may be traversed in any order with or without regard to the order of the paragraphs in the text (in those embodiments, step 10 may be optional). In certain embodiments of the invention, a profile may be created for the entire text, or a part thereof.

It should be further noted that although the process is described as being linear, and recursive, in alternate embodiments the steps can be performed simultaneously or several at a time, for example steps 30-50 may be performed on all paragraphs, simultaneously, using parallel processing.

In step 35, the computer system preferably establishes a connection to a dictionary source and extracts definitions for one or more, or each, noun contained within the Selected Paragraph. It should be noted that the dictionary may be stored in a database and included within the computer system, or the computer system may connect to a dictionary that is created and administered by a third-party (e.g., Merriam-Webster), and the computer system may establish a connection thereto via a network such as the internet In step 40, since most dictionaries have multiple definitions for a single word, the set of definitions for the nouns is divided into paragraphs, with each paragraph preferably signifying a single possible definition for the noun ("Definition Paragraph"). It should be noted, that in certain embodiments, the dictionary used may be an encyclopedia, in which case each paragraph would not be a definition for the noun, and in which case the Definition Paragraph would include all, or several, of the paragraphs in the definition. As described herein, in certain cases multiple words may have a single definition paragraph, for example in cases of phrases, such as "hot dog" or idioms such as "under the weather." These paragraphs may be profiled using methods described in U.S. Pat. No. 6,199,067, which is incorporated by reference herein.

In step 45 the profile of each Definition Paragraph (or the entire definition if the dictionary is an encyclopedia or a similar dictionary) is preferably compared to the profile of the paragraph from which the noun was extracted as well as the paragraph or paragraphs immediately prior and the paragraph or paragraphs immediately subsequent ("Surrounding Paragraphs") in order to determine the compatibility between the Definition Paragraph and the themes or contexts and/or optionally the subtext of the text surrounding the predicative phrase from which the noun was extracted. If the selected paragraph happens to be the first paragraph of the text or the chapter, then the profile of the Definition Paragraph is compared to the profile Selected Paragraph and profiles of some— for example, two-three—paragraphs subsequent thereto. Similarly, if the Selected Paragraph is the last paragraph, then the profile of the Definition Paragraph is compared to the profile of the Selected Paragraph and profiles of two-three preceding paragraphs. An exemplary method of determining compatibility is described in further detail below.

If the compatibility between the profile of the Definition Paragraph and either one of the profiles of the Selected Paragraph or the Surrounding Paragraphs exceeds a certain threshold then, in Step 50, the predicative phrase from which the noun originated is stored in a new database that is intended to hold the structured data representative of the text that was uploaded ("Structured DB"). This is because a sufficient compatibility indicates the relevance of the noun, and the predicative phrase from which the noun originated, to the text. Once the computer system processes one or more or all of the nouns within a Selected Paragraph, it selects another next paragraph and restarts the process at step 30 until all of the paragraphs within a given text have been processed. In alternate embodiments, the Structured DB may be an existing database, or, alternatively, the information may be stored within the metadata of the text that has been uploaded.

Within the context of step 45, in order to utilize a substantial sample of context and/or subtext of text when determining relevance, the paragraphs that precede and follow the Selected Paragraph are preferably defined as being at least 200 words long. Other lengths are also contemplated herein. Therefore, for example, if the Selected Paragraph is preceded by a paragraph that is less than 200 words, then the computer system preferably considers further preceding paragraphs, until the number of words within the preceding paragraphs equals or is greater than 200 words. Thus, if the Selected Paragraph is in the middle of a chapter, it will be preceded and followed by at least 200 words, and if the Selected Paragraph is first or last paragraph it will be followed or preceded by at least 400 words, respectively. It should be noted, that the invention should not be limited to any specific number of words or paragraphs, the profiles of which, are compared to the profile of the Definition Paragraph.

One exemplary method of determining compatibility between the profile of the Definition Paragraph and the Selected Paragraph and Surrounding Paragraphs, may be based upon a compatibility algorithm, such as:

$$\text{Compatibility} = \left( \frac{\text{Sum(Weight of the same phrase in User summary} * \text{Weight of the same phrase in Text summary)}}{sqrt(\text{Sum(Weight of each phrase in User summary}^2) * \text{Sum(Weight of each phrase in Text summary}^2))} \right) * 100$$

where the weight refers to the frequency that a context phrase occurs in relation to other context phrases.

In the exemplary algorithm, determination of the weight of a predicative phrase in a paragraph, is preferably performed by first analyzing the weight of the predicative phrase in each sentence of the paragraph. Each clause of a sentence may be treated as an individual sentence—the clauses are determined (based upon figures of speech and punctuation marks). For each such sentence, the number of all context phrases that occur in that sentence is calculated. If there are 24 different context phrases in a sentence, then the weight of each phrase in the text is 1/24.

To determine the weight of a context phrase in the paragraph, the weights of the relevant context phrases in each sentence of the paragraph are added together. If there are four sentences and the weights of the relevant context phrase are 1/24, 1/4, 1/6, and 1/2, then the weight of the context phrase in the paragraph is 23/24.

Additionally, because paragraphs can be different lengths, in order to improve accuracy of the matching, the weight of the context phrase in each paragraph may be further weighted based on the size of the entire paragraph. For example, if the paragraph is 120 words then the weight of the context phrase in that paragraph is divided by 120: (23/24)/120. It should be noted this algorithm is exemplary, and alternate algorithms may be used within the scope of this invention so long as the desired accuracy in matching is achieved. Furthermore, when compiling the profile of the definition paragraph, the weighing based upon the length of the paragraph is not necessary, and may be totally, or partially, discounted due to the expectation that the definition paragraph is unlikely to contain any extraneous information. In the preferred embodiment the compatibility score for including a predicative phrase in the Structured DB is at least 20, although any other score or compatibility algorithm and resulting scores, may be utilized.

In alternate embodiments of the present invention, steps 6 through 10 may be performed with figures of speech other than nouns, such as verbs, idioms, common phrases or expressions, or adjectives, in order to increase the precision of the Structured DB. For example, if a noun of a particular predicative phrase has a Definition Paragraph that is compatible with the Selected Paragraph and/or Surrounding Paragraphs, but the verb of the predicative phrase is not compatible, then the predicative phrase may be excluded from the Structured DB.

Since textual information is often not perfect in terms of grammar or spelling, in certain embodiments it may be advantageous to include methods of extracting predicative phrases from sentences that include missing subjects, missing predicates, and/or other grammatical mistakes or oddities. Such a method is preferably incorporated into step 20, although it may be incorporated at other times, for example, before starting process 100.

In certain embodiments of the present invention the computer system may compensate for clauses or sentences that are missing subjects, predicates, or adjectives. To compensate for a missing predicate, the verb "is" or one of its forms (e.g., are, were, was) may be used when extracting predicative phrases from the sentence or clause, where the selection of the proper tense of the verb "is" is preferably based upon rules of grammar and the contexts and subtexts of the surrounding sentences.

For sentences or clauses that are missing a subject, the computer system may add to the sentence a pronoun "it", "I", "he", "she", "they," may be used when extracting predicative phrases from the sentence or sentence, where the selection of the form of the pronoun is preferably selected based upon rules of grammar and the contexts and subtexts of the surrounding sentences. For example, if the sentences that surround the given sentence or clause (that is lacking a subject) are about a woman, then the pronoun "she" is preferably added to the clause that is lacking a subject.

It should be noted that addition of missing subjects or predicates do not have to be performed together, and algorithms other than the ones described may be used to add subjects or predicates to sentences or clauses that lack them, for example by using the subject or predicate of the immediately preceding clause or sentence or some alternative algorithm that accounts for the missing subject and/or predicate.

The system may also be configured to handle clauses or sentences that include no parts of speech beside the noun/verb subject/predicate pair. In those instances, the computer system may add a preposition/adjective "in" when extracting predicative phrases from the sentence, although other prepositions may be used and additional or alternative parts of speech may be added such as an article.

Figure 2:
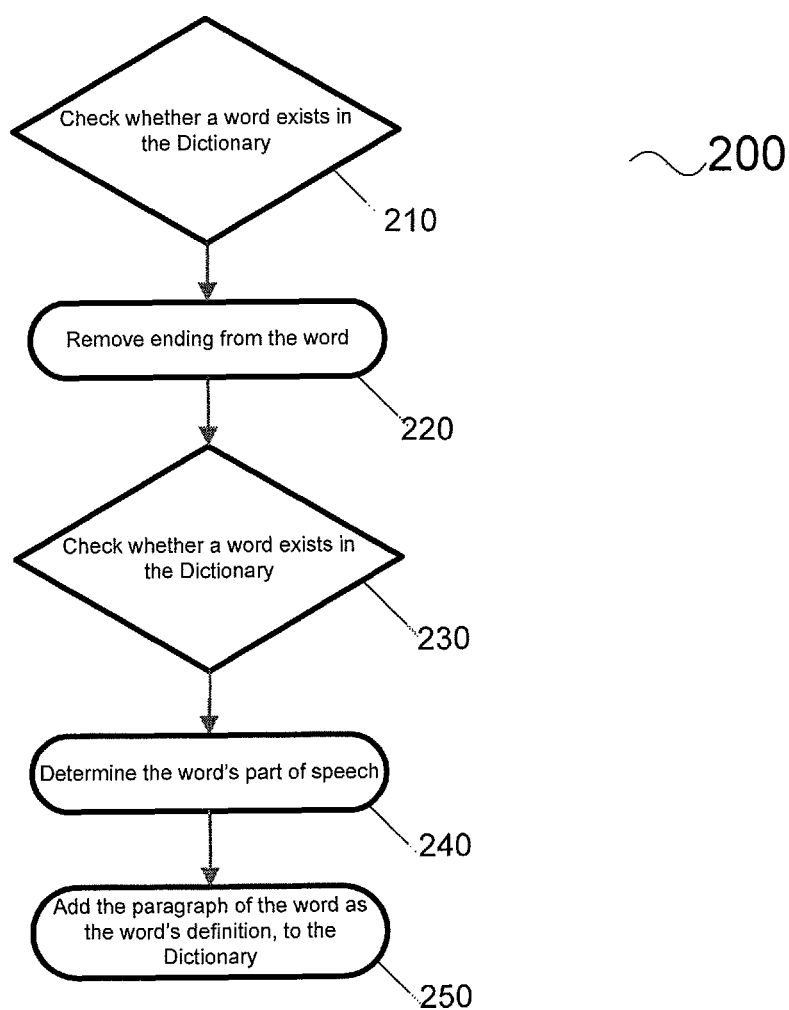
FIG. 2 is a flow chart of an exemplary process for creating definitions for new words, that may be used in an embodiment of the present invention.

As described with reference to FIG. 2, the system for creating structured data may include a process 200 for creating definitions for new words that exist in the text being analyzed, but do not exist in dictionaries. This can be particularly useful in creating structured data from works of fiction where the author makes up their own names for things. For example, Lewis Carroll's famous poem, "Jabberwocky," includes many words that have no conventional meaning but make sense in context.

The process 200 for defining new words begins with step 210, where a system checks whether a word is in the dictionary. If such word is not, the system, in step 220, removes an ending from the word, for example -s, -es endings which connote whether the word plural or singular, or that it is a verb, however, in alternate embodiments other endings such as -ing, may also be removed. After the removal of the ending, in step 230, the word is again checked against the dictionary. If it is still not in the dictionary, the system can assume that the word is a "new word" that needs a definition. This new word is then analyzed to determine what part of speech it is in step 240. This analysis may be based upon common laws of grammar, whether it is adjacent to a proposition, whether includes known suffixes and/or endings, and/or the words that surround the new word. Once the new word's part of speech is determined, the paragraph containing the new word, becomes the new word's Definition paragraph in step 250. If, in the future, the system ever comes across the same word, it would apply this definition paragraph instead of repeating the process. It should be noted that this exemplary process assumes correct spelling of words in the text, however, a spell-check program may be executed before this process 200, or during this process 200, for example after step 220, to ensure that a new word is, indeed new, and not simply an accidental misspelling

What is claimed is:

1. A computer system implemented method of creating and using structured data from a textual input, the method comprising:
   providing a table for structured data;
   receiving at least one textual input;
   dividing at least a portion of the textual input into one or more paragraphs;
   for each of the paragraphs, creating a profile by extracting one or more predicative phrases from the paragraph;
   for each of the predicative phrases, extracting a noun from the predicative phrase;
   for each extracted noun, receiving a textual definition from the dictionary corresponding to the noun of the predicative phrase;
   dividing the textual definition for each noun into one or more definition paragraphs, and creating a profile for each definition paragraph by extracting one or more predicative phrases of the definition paragraph;
   comparing the profile of each definition paragraph to the profile of the paragraph containing the respective noun based upon an algorithm for compatibility; and
   adding the predicative phrase containing the noun into the table for structured data if the algorithm for compatibility is satisfied.

2. The method of claim 1, wherein the step of receiving a textual definition includes the steps of establishing a connection to a dictionary and extracting the textual definition from the dictionary.

3. The method of claim 1, further comprising the step of dividing the text into chapters.

4. The method of claim 3, wherein each predicative phrase is a combination of a noun, verb, adjective, and an article.

5. The method of claim 1, wherein the step of comparing further includes comparing the profile of each definition paragraph to the profiles of paragraphs surrounding the paragraph containing the respective noun.

6. The method of claim 5, wherein the profiles of the paragraphs surrounding the paragraph containing the respective nouns are created from the paragraph preceding and the paragraph following the paragraph containing the noun if that paragraph is not the first or last in the chapter; wherein the profiles of the paragraphs surrounding the paragraph are the two paragraphs following the paragraph containing the noun if that paragraph is the first in the chapter; wherein the profiles of the paragraphs surrounding the paragraph are the two paragraphs preceding the paragraph containing the noun if that paragraph is the last in the chapter.

7. The method of claim 6, wherein each paragraph is at least 200 words long.

8. The method of claim 7, wherein the textual input is selected from the group consisting of book, periodical, electronic mail, short message service message, or website.

9. The method of claim 1, comprising dividing the textual input into clauses of sentences and treating each clause of the textual input as a paragraph.

10. A non transitory computer readable medium containing a program which performs the functions of:
    providing a table for structured data;
    receiving at least one textual input;
    dividing the textual input into paragraphs;
    dividing the paragraphs into clauses;
    for each of the clauses, creating a first profile by extracting one or more first predicative phrases of the clause;
    for each of the first predicative phrases, establishing a connection to a dictionary and extracting textual definitions from the dictionary corresponding to each noun in the first predicative phrase;
    dividing the textual definitions for the respective nouns into definition paragraphs;
    creating a second profile for each definition paragraph by extracting one or more second predicative phrases of the definition paragraph;
    comparing the second profile of each definition paragraph to the first profile of the paragraph from the textual input containing the noun corresponding to the definition paragraph and its surrounding paragraphs of the textual input based upon an algorithm for compatibility; and
    adding the predicative phrases containing the noun into the database for structured data if the algorithms for compatibility is satisfied.

11. The computer readable medium of claim 10 wherein the following functions are performed during the extraction of the textual definition if none is found in the dictionary:
    remove the ending from the noun that is not found in the dictionary;
    extract the textual definition from the dictionary for the noun without the ending;
    if no definition is found for the noun without the ending, determine the part of speech of the noun without the ending;
    treat the paragraph including the noun that is not found in the dictionary as the textual definition of the noun without the ending for the entire textual input.

12. The computer readable medium of claim 10, wherein the dictionary is selected from the group consisting of a locally stored dictionary, a remotely-stored dictionary, a locally-stored encyclopedia, and a remotely-stored encyclopedia.

13. The computer readable medium of claim 10 wherein each surrounding paragraph contains at least 200 words.

14. The computer readable medium of claim 10, wherein dividing into paragraphs is based upon an indicator selected from a group consisting of a tab, a hard return, a dash.

15. The computer readable medium of claim 10, further including dividing the textual input by chapter based upon chapter headings.

16. The computer readable medium of claim 10, wherein the predicate phrases include at least a noun and a verb and an adjective.

17. A computer-implemented system comprising:
    a structured data facility configured to store a table for structured data;
    a receiving facility configured to receive at least one textual input;
    a first dividing facility configured to divide at least a portion of the textual input into clauses;

a first profile creating facility configured to create respective profiles for the clauses by extracting respective predicative phrases from the clauses;

a noun extracting facility configured to extract respective nouns from the predicative phrases;

a dictionary facility configured to receive, for the extracted nouns, respective textual definitions from a dictionary, said definitions corresponding to the respective nouns of the respective predicative phrase;

a second dividing facility configured to divide the textual definitions for the respective nouns into definition clauses;

a second profile creating facility configured to create respective profiles for the definition clauses by extracting respective predicative phrases of the definition clauses;

a comparing facility configured to compare the profile of each definition clause to the profile of the textual input clause containing the respective noun, based upon an algorithm for compatibility; and an adding facility configured to add the predicative phrase containing the noun into the table for structured data if the algorithm for compatibility is satisfied.

18. The system of claim 17 in which the second profile creating facility is configured to create a respective profile for each of the textual input clauses.

19. The system of claim 18 in which the first profile creating facility is configured to create a respective profile for each of the definition clauses.

20. The system of claim 19 in which the definitions comprise sentences and the system treats each sentence of a definition as a definition clause.

\* \* \* \* \*